(12) United States Patent
Morrow et al.

(10) Patent No.: US 7,917,702 B2
(45) Date of Patent: Mar. 29, 2011

(54) DATA PREFETCH THROTTLE

(75) Inventors: Michael William Morrow, Cary, NC (US); James Norris Dieffenderfer, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 703 days.

(21) Appl. No.: 11/775,320

(22) Filed: Jul. 10, 2007

(65) Prior Publication Data

US 2009/0019229 A1 Jan. 15, 2009

(51) Int. Cl.
*G06F 12/08* (2006.01)
(52) U.S. Cl. .................... 711/137; 711/E12.057
(58) Field of Classification Search ............ 711/137
See application file for complete search history.

(56) References Cited

U.S. PATENT DOCUMENTS

| | | | | |
|---|---|---|---|---|
| 5,367,656 | A * | 11/1994 | Ryan | 711/213 |
| 5,983,324 | A * | 11/1999 | Ukai et al. | 711/137 |
| 6,247,107 | B1 * | 6/2001 | Christie | 711/216 |
| 6,978,349 | B1 * | 12/2005 | Wilkes | 711/118 |
| 7,162,567 | B2 | 1/2007 | Jeddeloh | |
| 7,313,655 | B2 | 12/2007 | Hsu | |
| 2002/0073406 | A1 * | 6/2002 | Gove | 717/154 |
| 2004/0123043 | A1 * | 6/2004 | Rotithor et al. | 711/137 |
| 2004/0221111 | A1 * | 11/2004 | Phelps et al. | 711/137 |
| 2004/0260883 | A1 * | 12/2004 | Wallin et al. | 711/137 |
| 2005/0076181 | A1 * | 4/2005 | Hsu | 711/137 |
| 2005/0257005 | A1 * | 11/2005 | Jeddeloh | 711/115 |
| 2006/0090036 | A1 * | 4/2006 | Zohar et al. | 711/133 |
| 2006/0174228 | A1 * | 8/2006 | Radhakrishnan et al. | 717/127 |
| 2007/0239940 | A1 * | 10/2007 | Doshi et al. | 711/137 |

OTHER PUBLICATIONS

European Search Report-EP08005493, Search Authority-The Hague-Jun. 18, 2008.
European Written Opinion-EP08005493, Search Authority-The Hague-Jun. 18, 2008.
International Search Report-PCT/US08/069710, International Search Authority-European Patent Office-Oct. 24, 2008.
Written Opinion-PCT/US08/069710, International Search Authority-European Patent Office-Oct. 24, 2008.
Xiaotong Zhuang and Hsien-Hsin S. Lee; Reducing Cache Pollution Via Dynamic Data Prefetch Filtering; IEEE Transactions on Computers; Jan. 2007; pp. 18-31; vol. 56, No. 1; IEEE Computer Society.
Jose R. Brunheroto, Valentina Salapura, Fernando F. Redifolo, Dirk Hoenicke and Alan Gara; Data Cache Prefetching Design Space Exploration for BlueGene/L. Supercomputer; Proceedings on the 17th International Symposium on Computer Architecture and High Performance Computing; 2005; IEEE Computer Society.
Richard L. Oliver and Patricia J. Teller; Dynamic and Adaptive Cache Prefetch Policies; IEEE; 2000; pp. 509-515.

* cited by examiner

*Primary Examiner* — Kaushikkumar Patel
(74) *Attorney, Agent, or Firm* — Nicholas J. Pauley; Jonathan T. Velasco; Tim Loomis

(57) ABSTRACT

A system and method taught herein control data prefetching for a data cache by tracking prefetch hits and overall hits for the data cache. Data prefetching for the data cache is disabled based on the tracking of prefetch hits and data prefetching is enabled for the data cache based on the tracking of overall hits. For example, in one or more embodiments, a cache controller is configured to track a prefetch hit rate reflecting the percentage of hits on the data cache that involve prefetched data lines and disable data prefetching if the prefetch hit rate falls below a defined threshold. The cache controller also tracks an overall hit rate reflecting the overall percentage of data cache hits (versus misses) and enables data prefetching if the overall hit rate falls below a defined threshold.

26 Claims, 4 Drawing Sheets

DATA PREFETCH THROTTLE

BACKGROUND

The present invention relates generally to the field of processors and in particular to a system and method for controlling data prefetching in processors.

Processors use caching to relieve memory-associated processing bottlenecks. Instruction caching works, for example, by using faster-access memory to hold selected portions of a larger set of program instructions stored in slower memory, such as main memory or a higher-level of cache memory.

Instructions present in the cache are thus accessed with lower delays than would be required for access to the slower memory, and processors commonly employ some form of hardware-based instruction prefetching to keep the instruction cache filled with needed lines of instructions from the slower memory. Prefetching places lines of instructions from slower memory into the instruction cache before instructions within those lines are needed.

Hardware-based prefetching also may be applied to data. However, successfully prefetching data can be more difficult than successfully prefetching instructions. For example, data values may be more scattered or spread out in memory than program instructions, making predictive-based prefetching more challenging. As such, data prefetching may or may not improve performance, and the performance of data prefetching may change dramatically during processor operation.

Thus, it is known for example to "filter" prefetch operations. Prefetch filtering represents a "pollution" avoidance mechanism, where the data cache is considered polluted when it contains prefetched data lines that are never used, i.e., data lines that are prefetched but ultimately replaced before ever being accessed (hit). As such, prefetch filtering implies carrying out data prefetching on an ongoing basis but selectively skipping certain data prefetches that otherwise would be carried out absent such filtering.

In more detail, individual data prefetches may or may not be performed in dependence on the applied filtering criteria. The filtering criteria may reflect a prefetching performance history developed, for example, over some range of program execution. However, the determination of appropriate filtering may require undesirable hardware complexity or resource consumption, particularly to yield meaningful performance improvements over data prefetching without filtering.

SUMMARY

According to one or more embodiments, a method of controlling data prefetching for a data cache comprises tracking prefetch hits for the data cache and disabling data prefetching for the data cache based on the tracking of prefetch hits. The method further includes tracking overall hits for data cache and enabling data prefetching for the data cache based on the tracking of overall hits. In this context, disabling data prefetching comprises disabling all data prefetching for the data cache, although data lines are still fetched into the data cache as needed, e.g., on data cache misses, irrespective of whether data prefetching is enabled.

In at least one embodiment taught herein, a processor includes a data cache comprising cache memory and a cache controller. The cache controller disables data prefetching for the data cache based on tracking prefetch hits for the data cache and enables data prefetching for the data cache based on tracking overall hits for the data cache. In at least one such embodiment, the cache controller tracks the prefetch hits by tracking a prefetch hit rate and tracks the overall hits by tracking an overall hit rate (or, equivalently, an overall miss rate).

With the above examples in mind, data prefetching control as taught herein offers, among other things, the performance and power advantages of data prefetching on a conditional basis, while simultaneously offering simple and efficient hardware implementations.

DETAILED DESCRIPTION

Figure 1:
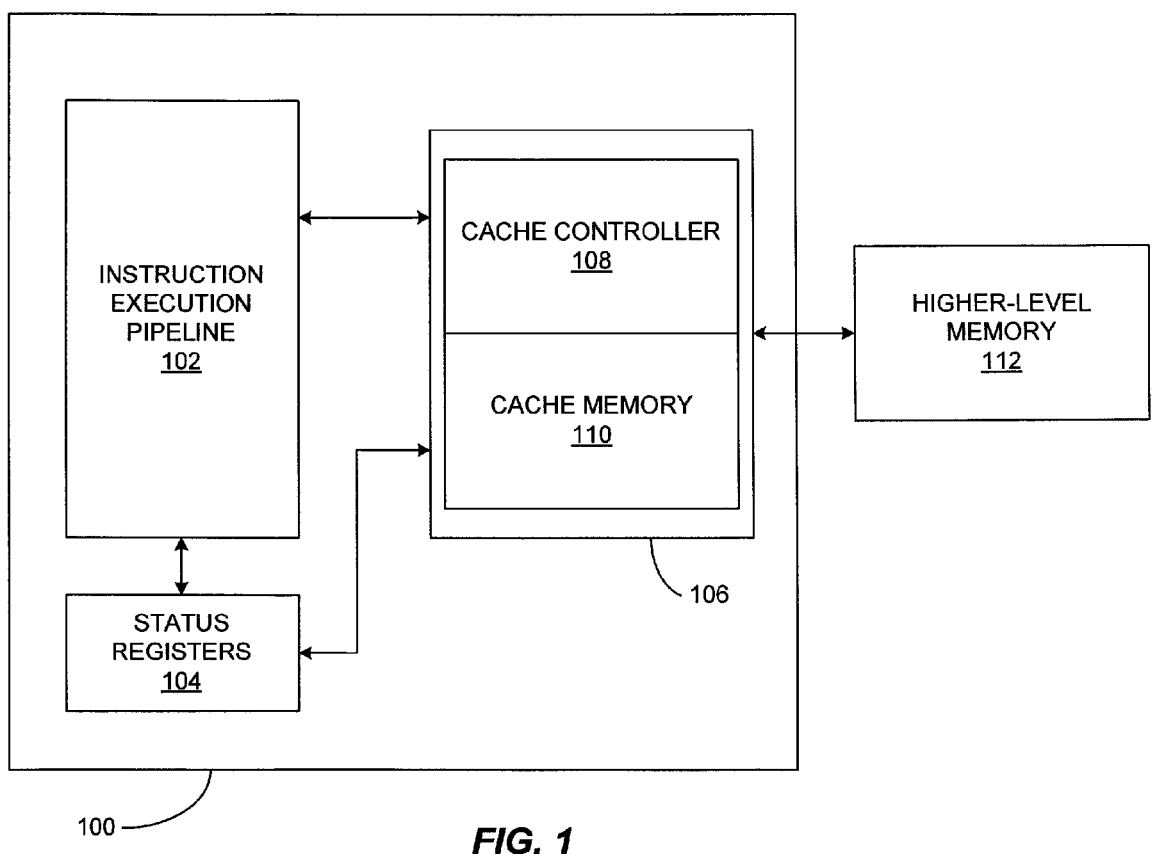
FIG. 1 is a functional block diagram of one embodiment of a processor.

As a non-limiting example, FIG. 1 illustrates one embodiment of a processor 100 that includes an instruction execution pipeline 102, status/control registers 104, and a data cache 106, which includes a cache controller 108 and associated cache memory 110. In operation, the data cache 106 caches lines of data from one or more higher levels of memory 112, which may include higher-level caches and/or main (system) memory. In at least one embodiment, the data cache 106 comprises a Level 1 ("L1") data cache.

Figure 2:
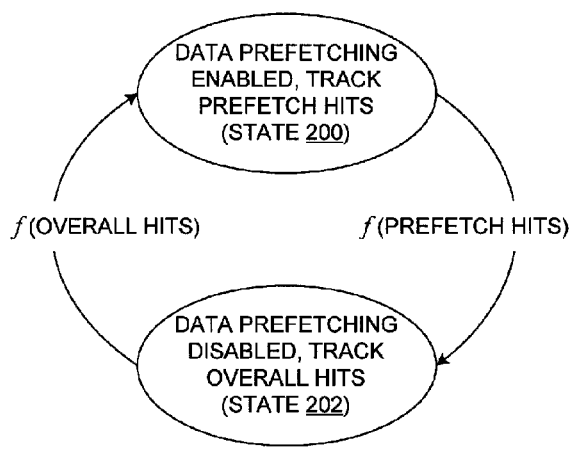
FIG. 2 is a state diagram for an embodiment of data prefetch control.

Advantageously, the (data) cache controller 108 is configured to enable and disable data cache prefetching dynamically according to logical control mechanisms that are implemented in the data cache 106 with low hardware complexity. FIG. 2 is a state diagram illustrating one embodiment of this advantageous prefetching control.

As shown in FIG. 2, State 200 represents an operational state of the data cache 106 where data prefetching is enabled, while State 202 represents an operational state of the data cache 106 where prefetching is disabled. Rather than screening or otherwise filtering individual prefetches, the cache controller 108 advantageously ceases all prefetching when operating in State 202. Thus, the prefetching control embodied in FIG. 2 operates like an on/off switch for data prefetching.

In one or more embodiments, the cache controller 108 transitions from State 200 (prefetching enabled) to State 202 (prefetching disabled) as a function of tracking "prefetch hits". Further, the cache controller 108 transitions from State 202 back to State 200 as a function of tracking "overall hits". In this context, "prefetch hits" are hits on prefetched data lines held in the cache memory 110 of the data cache 106, while "overall hits" are hits on any data line (prefetched or not) held in the cache memory 110 of the data cache 106. In this sense, the prefetch hits reflect the percentage of data cache hits that involve prefetched data lines and the overall hits reflect the overall percentage of cache hits. Equivalently, the cache controller 108 tracks cache misses. For example, if an overall hit rate for the data cache 106 is ninety percent, then the overall miss rate is ten percent.

In more detail, during program execution the processor 100 first looks for needed data in the data cache 106. A data cache hit represents the case where the needed data resides in the data cache 106. Conversely, a data cache miss represents the case where the needed data does not reside in the data cache 106. The cache controller 108 performs data fetches in response to data cache misses, which are often referred to as "compulsory fetches". On the other hand, assuming that prefetching is enabled, the cache controller 108 prefetches lines of data from the higher-level memory 112 into the cache memory 110 of the data cache 106 according to one or more prefetching strategies ("policies"). As a non-limiting example, the cache controller 108 may use sequence-based and/or pointer-based prefetching policies.

In any case, those skilled in the art will appreciate that the cache memory 110 contains a mix of prefetched and fetched (non-prefetched) data lines, assuming that the data cache 106 is operating with prefetching enabled (State 200). Thus, individual hits on the data cache 106 involve either a prefetched data line or a non-prefetched data line, and tracking the prefetch hits provides the cache controller 108 with insight regarding prefetching performance. Put simply, a low number of data cache hits involving prefetched data lines suggests that data prefetching is not helpful for current program execution conditions.

Disabling prefetching under these conditions is advantageous because it eliminates prefetching overhead (memory bus accesses and control). Shutting down prefetching—transitioning from State 200 to State 202—thus reduces processor operating power and reduces resource loading. Turning prefetching off for such conditions provides the further advantage of preventing the pollution of the data cache 106 with data lines that probably will not be used.

On the other hand, program execution conditions are subject to change such that prefetching again becomes desirable. To that end, the cache controller 108 tracks the overall hits for the data cache 106 while operating in State 202, and enables prefetching if the overall hits for the data cache 106 become too low, for example. (Equivalently, the overall misses become too high.) In other words, if the overall hit rate for the data cache 106 begins to suffer with data prefetching turned off, the cache controller 108 turns prefetching back on by transitioning back to State 200.

For example, the cache controller 108 tracks the prefetch hits as a prefetch hit rate and tracks the overall hits as an overall hit rate. In this manner, a defined disable threshold may be established for the prefetch disable decision at a default or dynamically calculated value. Likewise, a defined enable threshold may be established for the prefetch enable decision at a default or dynamically calculated value. As a non-limiting example, the cache controller 108 may be configured to turn off prefetching if the prefetch hit rate falls below two percent, and may be configured to turn on prefetching if the overall hit rate falls below ninety-nine percent. Of course, these are just example values, and the thresholds can be adjusted or otherwise tuned according to the particular processor characteristics and data cache size, and according to other considerations such as prefetching overhead, miss penalties, etc.

Figure 3:
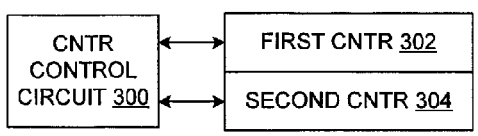
FIG. 3 is a functional block diagram of one embodiment of counting and control circuits useful in controlling data prefetch.

Regardless of the particular decision thresholds used, FIG. 3 illustrates one embodiment of tracking mechanisms that can be used by the cache controller 108 to track the prefetch hits and overall hits. More particularly, FIG. 3 illustrates a counter control circuit 300, a first counter 302, and a second counter 304. These circuits may be included in or associated with the cache controller 108.

In one or more embodiments, the counter control circuit 300 increments the first counter 302 in response to the cache controller 108 detecting hits on prefetched data lines in the cache memory 110, and decrements the first counter 302 in response to the cache controller 108 detecting hits that are not on prefetched data lines in the cache memory 110. In this manner, the value of the first counter 302 reflects the percentage of hits on the data cache 106 that are on prefetched data lines. As such, the counter control circuit 300 or another circuit element within the cache controller 108 can compare the value of the first counter 302 to the defined disable threshold as the basis for determining whether to transition to State 202.

Further, the counter control circuit 300 increments the second counter 304 in response to hits on the data cache 106 (any hits), and decrements the second counter 304 in response to data cache misses. In this manner, the value of the second counter 304 reflects the overall percentage of hits on the data cache. More particularly, by counting up on data cache hits and counting down on data cache misses, the value of the second counter 304 reflects a hit/miss percentage for the data cache 106. As such, the counter control circuit 300 or another circuit element within the cache controller 108 can compare the value of the second counter 304 to the defined enable threshold as the basis for determining whether to transition to State 200.

Figure 4:
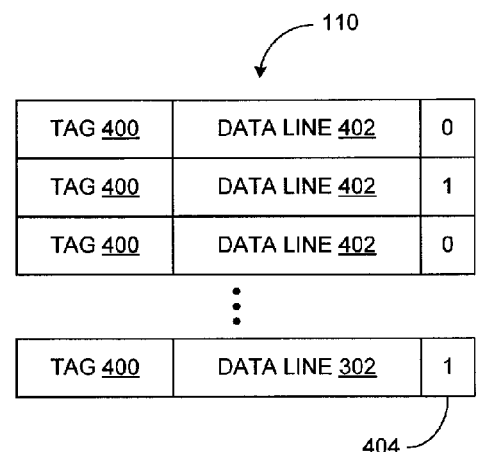
FIG. 4 is a functional block diagram of one embodiment of data cache memory, including indicators to denote prefetched data lines.
Figure 5:
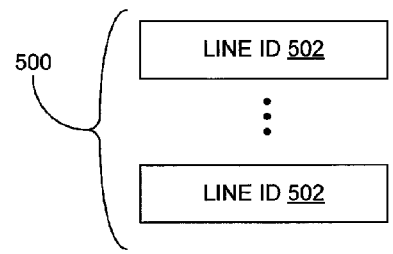
FIG. 5 is a functional block diagram of another embodiment of indicators to denote prefetched data lines in a data cache.

The above processing involves detecting whether individual data cache hits are on prefetched data lines in the cache memory 110. FIGS. 4 and 5 illustrate different embodiments of providing for that detection. In both figures, one sees that the cache controller 108 stores or otherwise maintains indicators that denote which data lines in the cache memory 110 were prefetched.

In particular, FIG. 4 illustrates an embodiment where the cache memory 110 comprises, for each data line held in the cache memory 110, tag memory 400 for holding memory address information, data memory 402 for holding the line of cached data, and a prefetch flag 404 to indicate the status of the data line as prefetched (e.g., "1") or not prefetched (e.g., "0").

Conversely, FIG. 5 illustrates an alternative embodiment, wherein the stored (prefetch) indicators are implemented as a register set 500, including a line identifier (ID) entry 502 for each prefetched data line in the cache memory 110. For example, entries may be added to the register set 500 for each data line prefetched into the cache memory 110, such that only prefetched data lines are represented in the register set 500. Alternatively, the register set 500 may include entries for all data lines in the cache memory 110, each entry indicating whether or not the corresponding data line in the cache memory 110 is prefetched.

Figure 6:
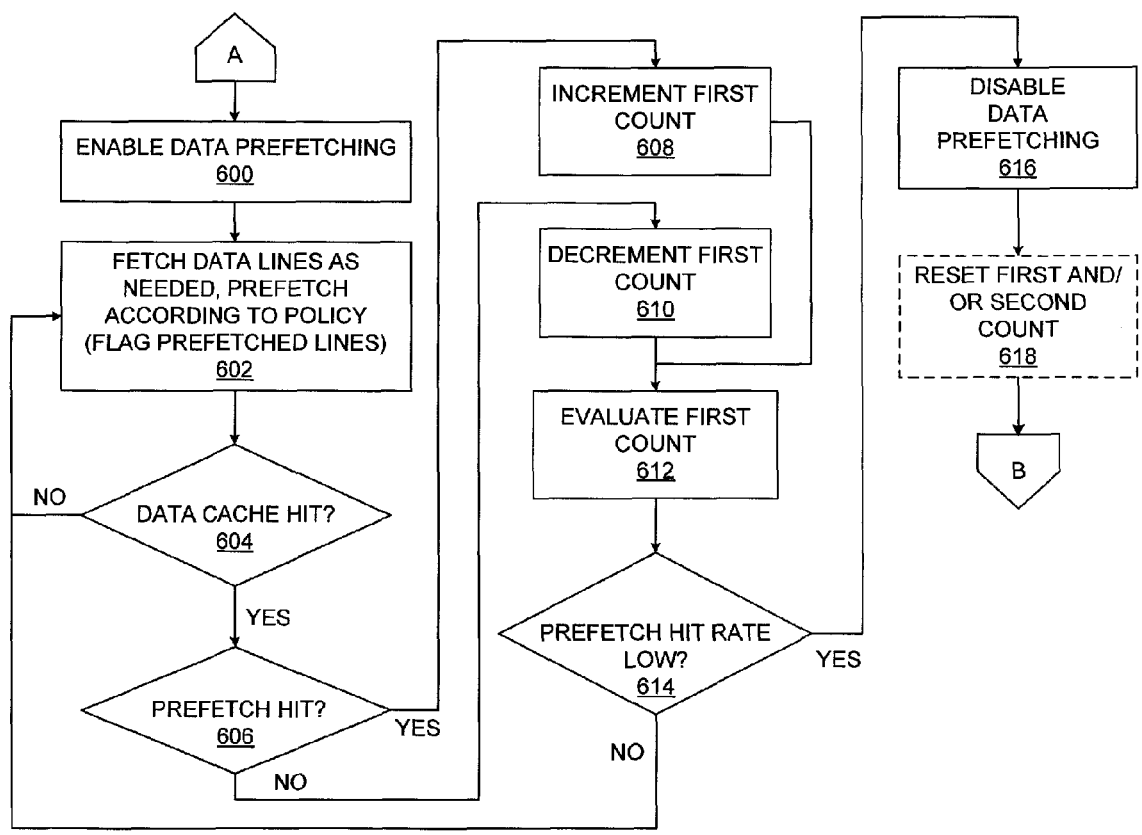
FIGS. 6 and 7 are logic flow diagrams of one embodiment of processing logic for controlling data prefetch.
Figure 7:
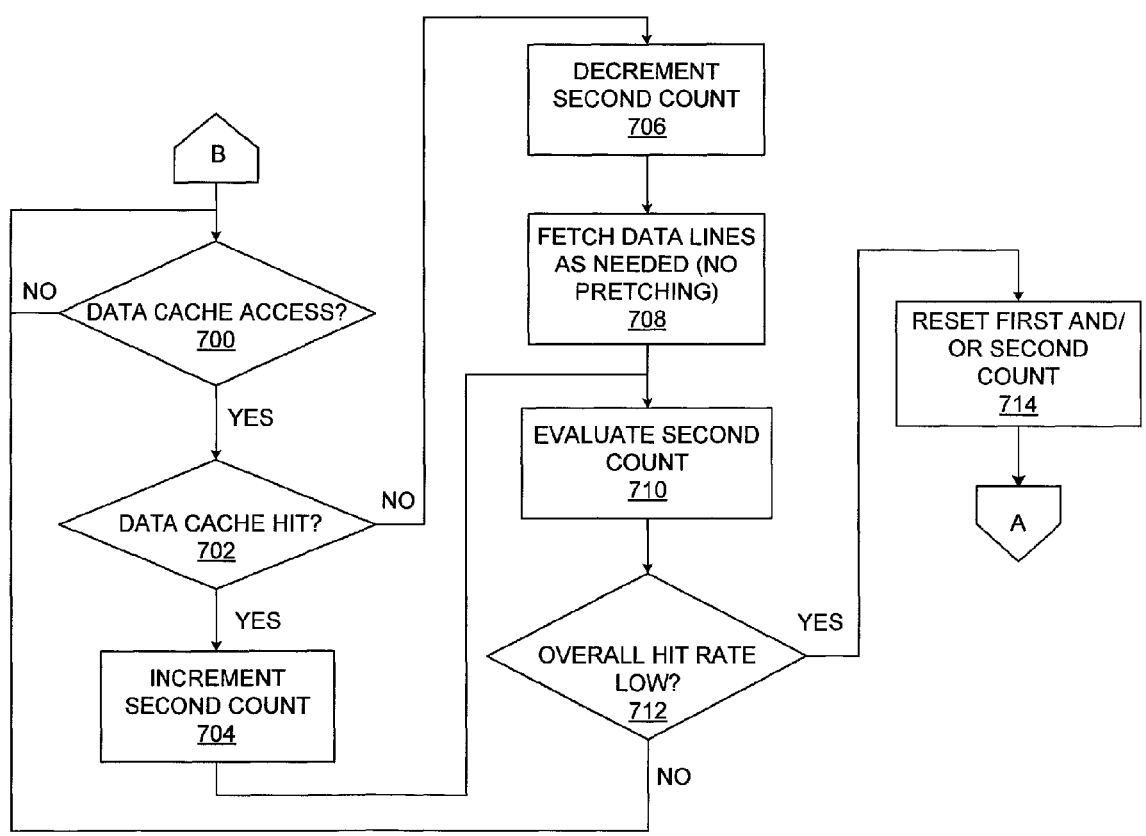

FIGS. 6 and 7 together illustrate one embodiment of processing logic that exploits use of the stored indicators (404 or 502) to detect prefetch hits. As a non-limiting example, the illustrated processing may be implemented by the cache controller 108 via digital processing logic, e.g., in a state machine. Further, it should be noted that one or more of the illustrated processing steps may be performed in other than the illustrated sequence, or may be performed concurrently with other steps, and/or may be performed as part of other processing tasks.

In broad accordance with the illustrated processing, the cache controller 108 uses a first count (e.g., the value of the first counter 302) to track prefetch hits on the data cache 106 and uses a second count (e.g., the value of the second counter 304) to track overall hits on the data cache 106. The first and second counters 302 and 304 may comprise saturating counters, such that the corresponding first and second count values saturate at respective maximums. Regardless of that detail, one or more embodiments of the cache controller 108 transition the data cache 106 between the prefetched enabled condition and the prefetch disabled condition as a function of the first and second count values. These counts may be initialized as part of beginning operations.

In more detail, the illustrated processing begins with enabling data prefetching for the data cache 106 (Block 600). In at least one embodiment, the cache controller 108 is configured to start operations with data prefetching enabled by default, such that starts or restarts of the processor 100 turn on data prefetching.

With prefetching enabled, the data cache controller 108 fetches data lines as needed into the data cache 106, and prefetches data lines into the cache according to the active prefetching policy (Block 602). Processing continues on a looping or otherwise ongoing basis with the cache controller 108 determining whether a data cache hit occurs (Block 604). If a data cache hit occurs (yes from Block 604), the cache controller 108 detects whether the hit was a prefetch hit (Block 606), e.g., it uses the stored (prefetch) indicators (404 or 502) to determine whether the particular data line involved in the cache hit was or was not a prefetched data line.

If the hit was a prefetch hit (yes from Block 606), the data cache controller 108 increments the first count (Block 608). If the hit was not a prefetch hit (no from Block 606), the data cache controller 108 decrements the first count (Block 610). The first count may be maintained in this manner by operating on the first counter 302 via the counter control circuit 300.

Operations continue with evaluating the first count (Block 612) to determine whether the value of the first count is above a defined disable threshold for prefetching. With that arrangement, the disable threshold may be set at a percentage value corresponding to the point at which prefetching is deemed undesirable. In any case, for a binary count value, that determination may be made by comparing the count value to a binary pattern corresponding to the desired threshold value. In at least one embodiment, the first counter 302 is sized according to the desired count resolution for tracking prefetch hits. Note, too, that the evaluation of the first count may be performed on each cache hit, or may be performed according to another schedule or triggering condition.

In any case, if the value of the first count indicates that the prefetch hit rate is too low (yes from Block 614), the cache controller 108 disables prefetching (Block 616). From there, processing optionally continues with resetting the first count and/or resetting the second count (Block 618). That is, one or both counts may be set in conjunction with making the transition from prefetched enabled to prefetched disabled in a manner that reinforces that state change.

In at least one such embodiment, the second count is reset to a maximum value as part of changing to the prefetch disabled state and the first count is reset to a maximum value as part of changing to the prefetch enabled state. Doing so prevents rapid state reversals (sometimes referred to as "ping-ponging"). More particularly, the example counter resetting represents one form of control hysteresis contemplated herein. It is broadly contemplated in one or more embodiments herein to implement enable/disable control hysteresis, such as by resetting the tracking mechanisms (counters or otherwise) used for tracking prefetch hits and overall hits, adjusting control thresholds, suspending state change processing temporarily after making a state change, etc.

Returning to the illustrated processing by following connector "B" to FIG. 7, one sees that the processing continues with prefetching turned off. While prefetching is disabled, the cache controller 108 continues monitoring for data cache accesses (Block 700). If there is a data cache access (yes from Block 700), the cache controller 108 detects whether the access resulted in a cache hit (Block 702). If the access resulted in a hit (yes from Block 702), processing continues with the cache controller 108 incrementing the second count (Block 704). Conversely, if the cache access resulted in a cache miss (no from Block 702), processing continues with the cache controller 108 decrementing the second count (Block 706) and fetching data lines as needed into the cache memory 110 (Block 708).

Processing then continues with evaluating the second count (Block 710). Cache accesses and/or counter updates may be used as the trigger for count evaluation, or another schedule or trigger may be used. In any case, the evaluation may comprise comparing the value of the second count to a defined enable threshold. In at least one such embodiment, the defined enable threshold represents a lower percentage value for data cache hits. With that arrangement, the overall hit rate is deemed low if the percentage of cache hits as tracked by the second count is at or below the lower percentage.

If the overall hit rate is not low (no from Block 712), processing loops back to Block 700. On the other hand, if the overall hit rate is low (yes from Block 712), processing continues through connector "A" back to Block 600 of FIG. 6 for prefetch enabling. (Note that the first and/or second counts may be reset as part of transitioning back to the prefetch enabled condition (Block 714)).

In an alternative embodiment, the cache controller 108 is configured to track prefetch hits based on counting or otherwise determining the number of prefetched data lines in the cache memory 110 (as compared to the overall number of data lines in the cache memory 110). The cache controller 108 may use the first counter 302 for counting prefetched data lines, or it may be configured with other counters and/or registers for tracking that information. In any case, the count of prefetched data lines in comparison to the overall count of data lines still reflects a prefetch hit rate in the sense that the number of prefetched data lines in the cache memory 110 will, because of the data cache replacement policy, decrease over time if prefetch hits are relatively infrequent.

With the above embodiments and other variations in mind, data cache prefetching control as taught herein broadly comprises tracking prefetch hits and tracking overall hits, such that transitions from the prefetch enabled condition are based on the prefetch hits and transitions from the prefetch disabled condition are based on the overall hits. In at least one embodiment, prefetching is disabled if the prefetch hit rate falls below a defined disable threshold, and prefetching is enabled if the overall hit rate falls below a defined enable threshold. Stored indicators may be used to denote which data lines are prefetched, and various counters or other registers may be used for the prefetch hit and overall hit tracking.

Therefore, although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of controlling data prefetching for a data cache, the method comprising:
   tracking prefetch hits for the data cache while data prefetching is enabled and selectively disabling data prefetching for the data cache based on the tracking of the prefetch hits;
   tracking overall hits for the data cache while data prefetching is disabled and selectively enabling data prefetching for the data cache based on tracking of the overall hits; and
   implementing a first control hysteresis by resetting a first tracking mechanism used for tracking the overall hits for the data cache in connection with disabling data prefetching for the data cache.

2. The method of claim 1, further comprising implementing a second control hysteresis by resetting a second tracking mechanism used for tracking the prefetch hits in conjunction with enabling data prefetching for the data cache.

3. The method of claim 1, further comprising in response to disabling the data prefetching, tracking overall hits for the data cache and enabling data prefetching for the data cache based on the tracking of the overall hits, wherein tracking the overall hits for the data cache comprises tracking an overall hit rate for the data cache.

4. The method of claim 3, further comprising storing indicators that indicate which data lines in the data cache are prefetched data lines, and using the stored indicators to track the prefetch hit rate.

5. The method of claim 3, wherein tracking the overall hit rate comprises incrementing a count in response to data cache hits and decrementing the count in response to data cache misses.

6. The method of claim 5, wherein enabling data prefetching for the data cache based on said tracking of the overall hits comprises enabling data prefetching for the data cache when the overall hit rate falls to a defined enable threshold as indicated by the count.

7. The method of claim 5, further comprising implementing enable hysteresis of data cache prefetching by resetting the count in conjunction with enabling data cache prefetching.

8. The method of claim 5, further comprising maintaining the count in a saturating counter configured to saturate at a maximum count value.

9. The method of claim 3, wherein the overall hit rate reflects an overall percentage of data cache hits versus data cache misses.

10. The method of claim 1, wherein disabling data prefetching for the data cache based on the tracking of the prefetch hits comprises disabling data prefetching for the data cache when the prefetch hit rate falls to a defined disable threshold.

11. The method of claim 10, wherein the defined enable threshold is established based on a dynamically calculated value.

12. The method of claim 10, wherein the defined enable threshold is adjusted based on at least one of prefetching overhead and miss penalties.

13. The method of claim 1, further comprising initializing the data cache to begin operation with data cache prefetching enabled.

14. The method of claim 1, further comprising prefetching data lines into the data cache according to one or more defined prefetching policies when data prefetching is enabled, and fetching data lines into the data cache responsive to data cache misses irrespective of whether data prefetching is enabled.

15. A processor comprising:
   an instruction execution pipeline; and
   a data cache operatively associated with the instruction execution pipeline and comprising cache memory and a cache controller;
   wherein the cache controller is configured to:
      track prefetch hits for the data cache while data prefetching is enabled and selectively disable data prefetching for the data cache based on the tracking of the prefetch hits;
      track overall hits for the data cache while data prefetching is disabled and selectively enable data prefetching for the data cache based on tracking of the overall hits; and
      reset a first tracking mechanism used for tracking the overall hits for the data cache in connection with disabling data prefetching for the data cache.

16. The processor of claim 15, wherein the cache controller is further configured to reset a second tracking mechanism used for tracking the prefetch hits in conjunction with data prefetching for the data cache.

17. The processor of claim 15, wherein the cache controller maintains indicators that indicate which data lines in the cache memory are the prefetched data lines, and uses the indicators to track the prefetch hit rate.

18. The processor of claim 15, wherein the cache controller is further configured, subsequent to disabling data prefetching, to track overall hits for the data cache and enable data prefetching for the data cache based on the tracking of the overall hits, wherein tracking the overall hits includes tracking an overall hit rate for the data cache.

19. The processor of claim 18, wherein the cache controller tracks the overall hit rate by incrementing a counter in response to data cache hits and decrementing the counter in response to data cache misses.

20. The processor of claim 19, wherein the cache controller enables data prefetching for the data cache when the overall hit rate falls to a defined enable threshold as indicated by the counter.

21. The processor of claim 19, wherein the cache controller implements enable hysteresis for controlling data cache prefetching by resetting the counter in conjunction with enabling data cache prefetching.

22. The processor of claim 19, wherein the counter comprises a saturating counter that saturates at a maximum count value.

23. The processor of claim 19, wherein the counter reflects an overall percentage of data cache hits versus data cache misses.

24. The processor of claim 15, wherein the cache controller disables data prefetching for the data cache when the prefetch hit rate falls to a defined disable threshold.

25. The processor of claim 15, wherein the cache controller initializes the data cache to begin operation with data cache prefetching enabled.

26. The processor of claim 15, wherein the cache controller prefetches data lines into the data cache according to one or more defined prefetching policies when data prefetching is enabled and fetches data lines into the data cache in response to data cache misses irrespective of whether data prefetching is enabled.

* * * * *